1

(12) United States Patent
Smith et al.

(10) Patent No.: US 10,865,773 B1
(45) Date of Patent: Dec. 15, 2020

(54) SYSTEM AND METHOD FOR MITIGATING FLICKER IN A POWER GRID FROM A WIND TURBINE POWER SYSTEM

(71) Applicant: General Electric Company, Schenectady, NY (US)

(72) Inventors: David Smith, Daleville, VA (US); Werner Gerhard Barton, Gescher (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/419,364

(22) Filed: May 22, 2019

(51) Int. Cl.
| F03D 7/00 | (2006.01) |
| F03D 7/04 | (2006.01) |
| F03D 9/25 | (2016.01) |
| F03D 7/02 | (2006.01) |
| F03D 17/00 | (2016.01) |

(52) U.S. Cl.
CPC ............ F03D 7/042 (2013.01); F03D 7/028 (2013.01); F03D 7/0272 (2013.01); F03D 9/25 (2016.05); F03D 17/00 (2016.05)

(58) Field of Classification Search
CPC . F03D 7/042; F03D 9/25; F03D 17/00; F03D 7/0272; F03D 7/28
See application file for complete search history.

(56) References Cited

U.S. PATENT DOCUMENTS

| 6,924,565 | B2 * | 8/2005 | Wilkins | F03D 9/257 290/44 |
| 7,804,184 | B2 * | 9/2010 | Yuan | H02J 3/386 290/44 |
| 9,450,415 | B2 * | 9/2016 | Larsen | H02J 3/386 |
| 9,458,830 | B2 * | 10/2016 | Barker | H02J 3/18 |
| 9,831,810 | B2 * | 11/2017 | Achilles | H02J 3/1842 |
| 2005/0253396 | A1 * | 11/2005 | Mikhail | F03D 7/0272 290/44 |
| 2006/0255594 | A1 | 11/2006 | Larsen | |
| 2019/0305703 | A1 * | 10/2019 | Holliday | F03D 17/00 |

FOREIGN PATENT DOCUMENTS

WO     WO-0173518 A1 * 10/2001    ............ F03D 9/255

* cited by examiner

Primary Examiner — Julio C. Gonzalez
(74) Attorney, Agent, or Firm — Dority & Manning. P.A.

(57) ABSTRACT

A method for compensating for flicker induced by a wind turbine power system connected to a power grid includes operating a power converter of the wind turbine power system based on a nominal reactive current command and a nominal torque command. In response to receiving a periodic torque command modifier, the method includes determining a reactive current command modifier for the power converter based on one or more operational parameters of the wind turbine power system and/or the power grid and the torque command modifier. The method also includes simultaneously modifying the nominal reactive current command as a function of the reactive current command modifier and the nominal torque command as a function of the torque command modifier. Accordingly, modifying the nominal torque command causes low-frequency voltage variations in the power grid and simultaneously modifying the reactive current command attenuates the low-frequency voltage variations.

18 Claims, 6 Drawing Sheets

SYSTEM AND METHOD FOR MITIGATING FLICKER IN A POWER GRID FROM A WIND TURBINE POWER SYSTEM

FIELD

The present disclosure relates generally to wind turbines and, more particularly, to a system and method for mitigating flicker in a power grid caused by, for example, a changing torque command of the wind turbine as each rotor blade passes the tower thereof.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

In many wind turbines, the generator may be electrically coupled to a bi-directional power converter that includes a rotor-side converter joined to a line-side converter via a regulated DC link. Such wind turbine power systems are generally referred to as a doubly-fed induction generator (DFIG). DFIG operation is typically characterized in that the rotor circuit is supplied with current from a current-regulated power converter. As such, the wind turbine produces variable mechanical torque due to variable wind speeds and the power converter ensures this torque is converted into an electrical output at the same frequency of the grid.

During operation, wind impacts the rotor blades and the blades transform wind energy into a mechanical rotational torque that drives a low-speed shaft. The low-speed shaft is configured to drive the gearbox that subsequently steps up the low rotational speed of the low-speed shaft to drive a high-speed shaft at an increased rotational speed. The high-speed shaft is generally coupled to the generator so as to rotatably drive a generator rotor. As such, a rotating magnetic field may be induced by the generator rotor and a voltage may be induced within a generator stator. Rotational energy is converted into electrical energy through electromagnetic fields coupling the rotor and the stator, which is supplied to a power grid via a grid breaker. Thus, the main transformer steps up the voltage amplitude of the electrical power such that the transformed electrical power may be further transmitted to the power grid.

For some wind turbines, it is desirable to modify the torque command of the power converter during operation of the wind turbine as each rotor blade aligns with and passes the tower. This modification, however, can tend to cause undesirable low-frequency voltage variations on the power grid. Such variations are often referred to as flicker. Thus, the term "flicker" as used herein generally refers to variations in current or voltage on the power grid that are perceptible at certain frequencies (e.g. from about 1 Hertz (Hz) to about 30 Hz). Oftentimes, grid requirements prohibit connection to the power grid if flicker is present in a certain amount.

Thus, the present disclosure is directed to a system and method for compensating for such flicker to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for compensating for flicker induced by a wind turbine power system connected to a power grid. The method includes operating, via a controller, a power converter of the wind turbine power system based on a nominal reactive current command and a nominal torque command. In response to receiving a periodic torque command modifier, the method includes determining, via the controller, a reactive current command modifier for the power converter based on one or more operational parameters of the wind turbine power system and/or the power grid and the torque command modifier. The method also includes simultaneously modifying, via the controller, the nominal reactive current command as a function of the reactive current command modifier and the nominal torque command as a function of the torque command modifier. Accordingly, modifying the nominal torque command causes low-frequency voltage variations in the power grid and simultaneously modifying the reactive current command attenuates the low-frequency voltage variations.

In an embodiment, the operational parameter(s) may include grid strength of the power grid, a grid voltage, a voltage signal from a primary winding of a main transformer of the wind turbine power system, a voltage signal from a secondary winding of the main transformer, a speed signal from a generator of the wind turbine power system, and/or an upstream impedance from the wind turbine power system.

In another embodiment, the controller may be a converter controller of the power converter. In an embodiment, the method may also include determining the reactive current command via a reactive power/VAR regulator module.

In further embodiments, the method may also include correlating, via the converter controller, the periodic torque command modifier with voltage variations as one or more rotor blades passes the tower and simultaneously modifying the nominal reactive current command as a function of the reactive current command modifier based on the correlation.

In one embodiment, the method may include determining a power command modifier as a function of the periodic torque command modifier and the speed signal from the generator.

In several embodiments, determining the reactive current command modifier for the power converter based on one or more operational parameters of the wind turbine power system and/or the power grid and the torque command modifier may include, for example, receiving the voltage signal from a primary winding of the main transformer, filtering the voltage signal via a filter (e.g. a high-pass filter), multiplying the filtered voltage signal by the power command modifier to obtain a multiplied signal, integrating the multiplied signal to obtain an integrated signal, multiplying the integrated signal by the power command modifier to obtain a reactive power command modifier, and dividing the reactive power command modifier by the voltage signal from the secondary winding of the main transformer to obtain the reactive current command modifier.

In another embodiment, simultaneously modifying, via the controller, the nominal reactive current command as a function of the reactive current command modifier and the nominal torque command as a function of the torque command modifier may include adding the nominal reactive current command from the reactive power regulator and the reactive current command modifier and adding the nominal torque command and the torque command modifier.

In another aspect, the present disclosure is directed to a wind turbine power system connected to a power grid. The wind turbine power system includes a power converter, at least one sensor for monitoring one or more operational parameters of at least one of the wind turbine power system or the power grid, and a converter controller configured to control the power converter. The converter controller is configured to perform a plurality of operations, including but not limited to operating the power converter based on a nominal reactive current command and a nominal torque command, in response to receiving a periodic torque command modifier, determining a reactive current command modifier for the power converter based on the one or more operational parameters and/or the power grid and the torque command modifier, and simultaneously modifying the nominal reactive current command as a function of the reactive current command modifier and the nominal torque command as a function of the torque command modifier, wherein modifying the nominal torque command causes low-frequency voltage variations in the power grid and simultaneously modifying the reactive current command attenuates the low-frequency voltage variations. It should be understood that the wind turbine power system may further include any of the additional features as described herein.

In yet another aspect, the present disclosure is directed to a method for mitigating low-frequency voltage variations in a power grid caused by a wind turbine power system connected thereto. The method includes receiving, via a controller, one or more operational parameters of at least one of the wind turbine power system or the power grid and a nominal torque command modifier. The method also includes modifying, via the controller, a reactive current command of the wind turbine power system as a function of the one or more operational parameters and the nominal torque command modifier while simultaneously modifying a torque command of the power converter based on the nominal torque command modifier so as to mitigate the low-frequency voltage variations. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
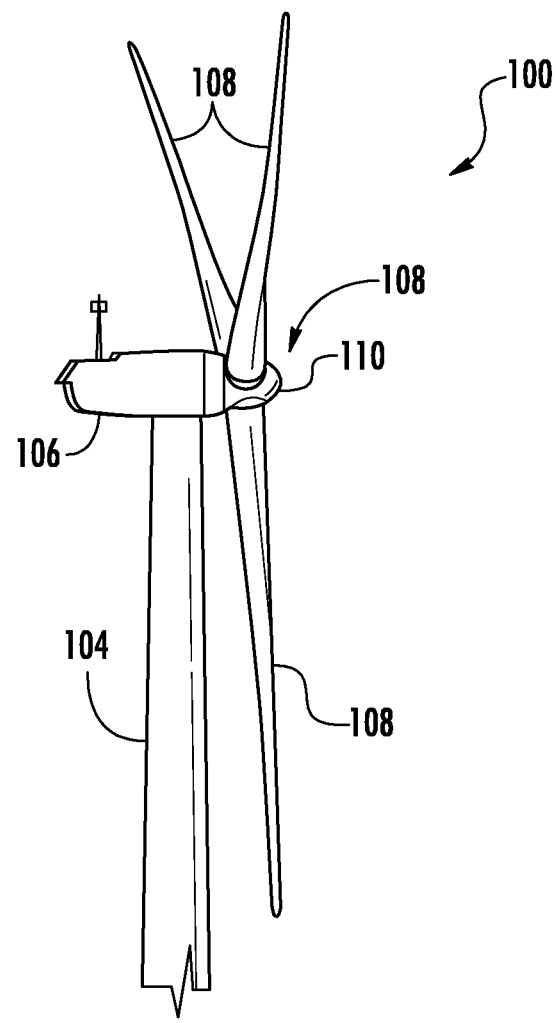
FIG. 1 illustrates a perspective view of a portion of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
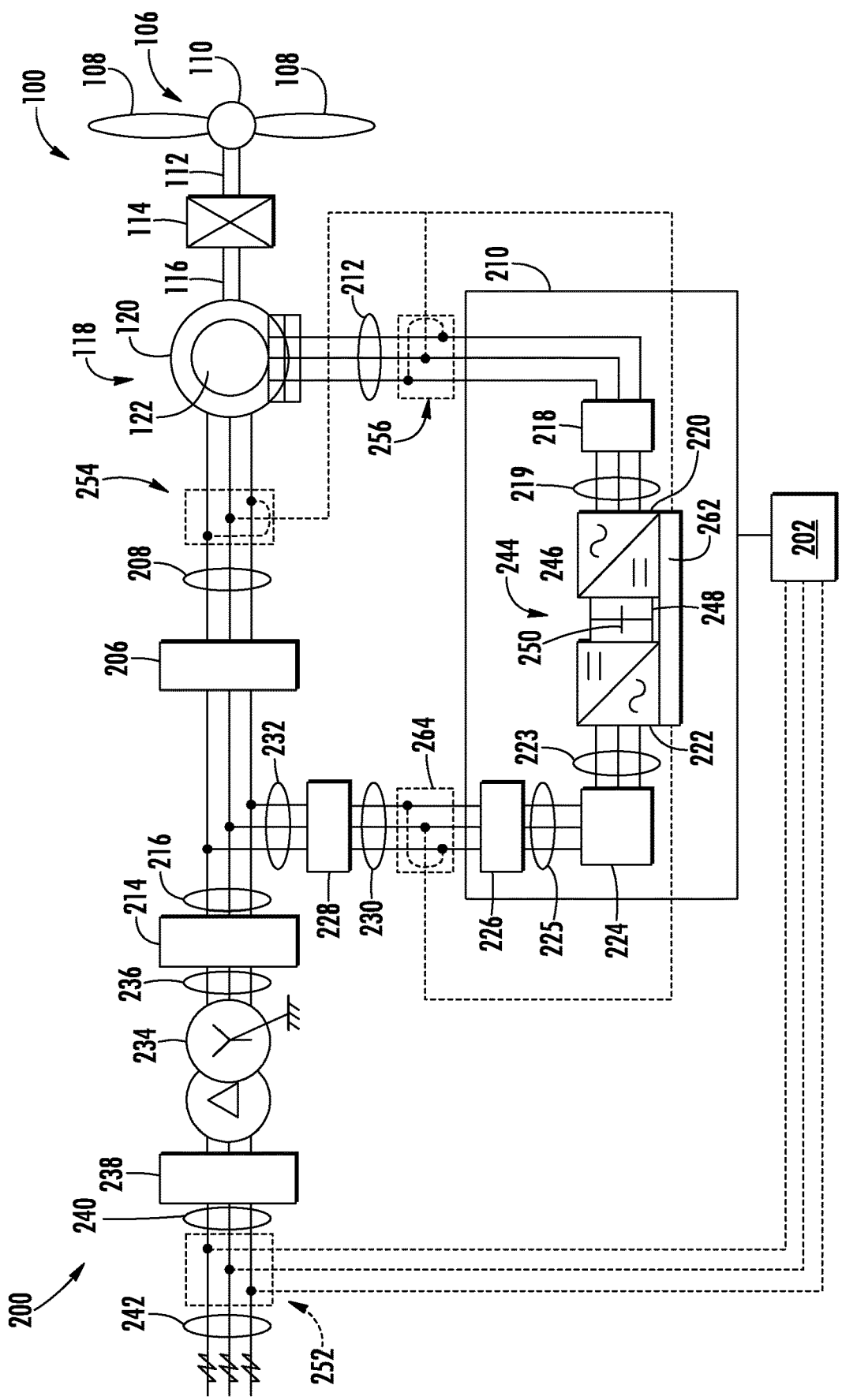
FIG. 2 illustrates a schematic view of one embodiment of an electrical power system suitable for use with the wind turbine shown in FIG. 1.

Referring now to the drawings, FIG. 1 illustrates a perspective view of a portion of one embodiment of a wind turbine 100 according to the present disclosure that is configured to implement the method as described herein. The wind turbine 100 includes a nacelle 102 that typically houses a generator 118 (FIG. 2). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Referring now to FIG. 2, a schematic view of one embodiment of an electrical power system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown).

More specifically, in one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

In addition, the electrical power system 200 may include a wind turbine controller 202 configured to control any of the components of the wind turbine 100 and/or implement the method steps as described herein. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2.

Figure 3:
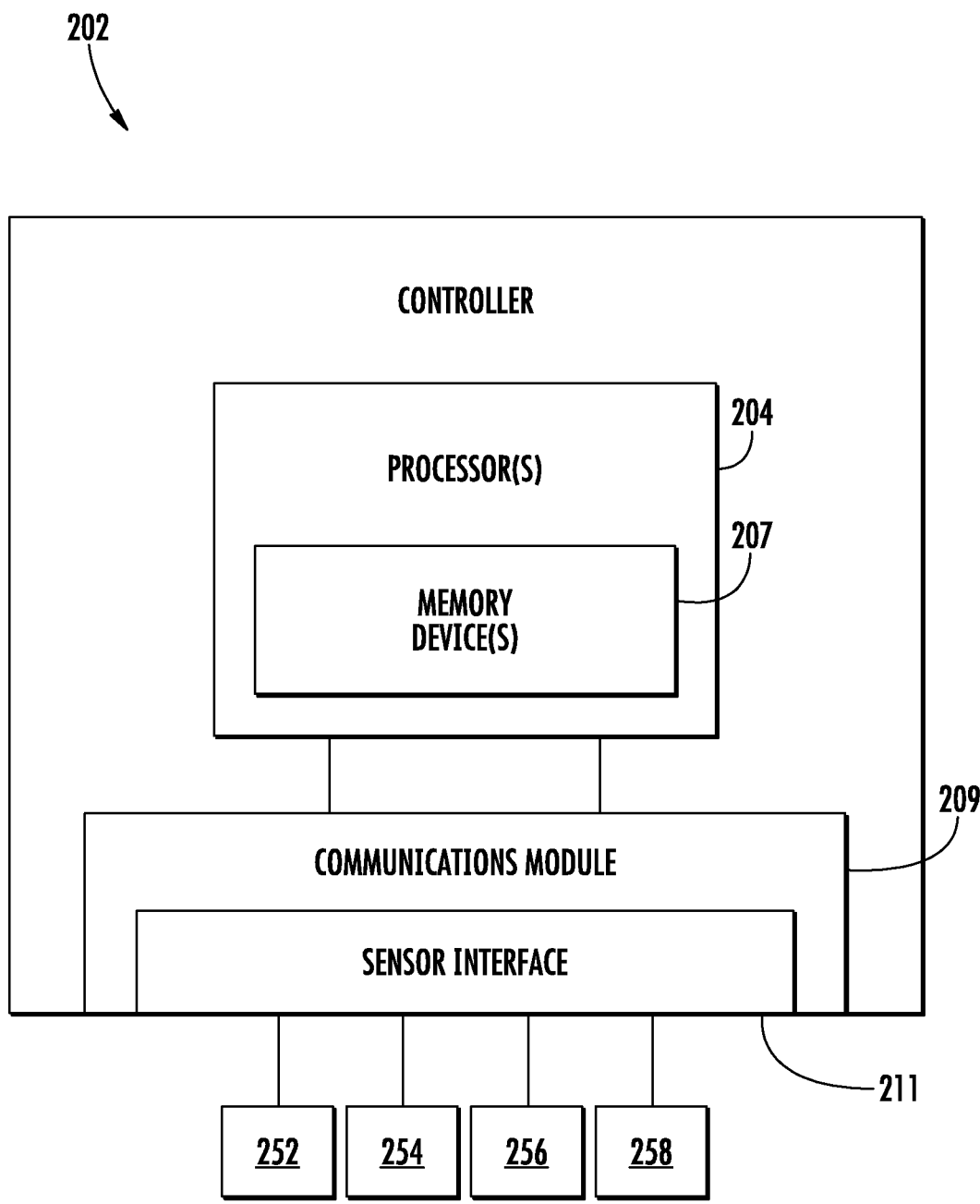
FIG. 3 illustrates a block diagram of one embodiment of a controller suitable for use with the wind turbine shown in FIG. 1.

Further, as shown in FIG. 3, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, the generator rotor 122 may be electrically coupled to a bi-directional power conversion assembly 210 or power converter via a rotor bus 212. Alternatively, the generator rotor 122 may be electrically coupled to the rotor bus 212 via any other device that facilitates operation of electrical power system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. In addition, the rotor filter 218 may include a rotor-side reactor. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. In addition, the line filter 224 may include a line-side reactor. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

Figure 4:
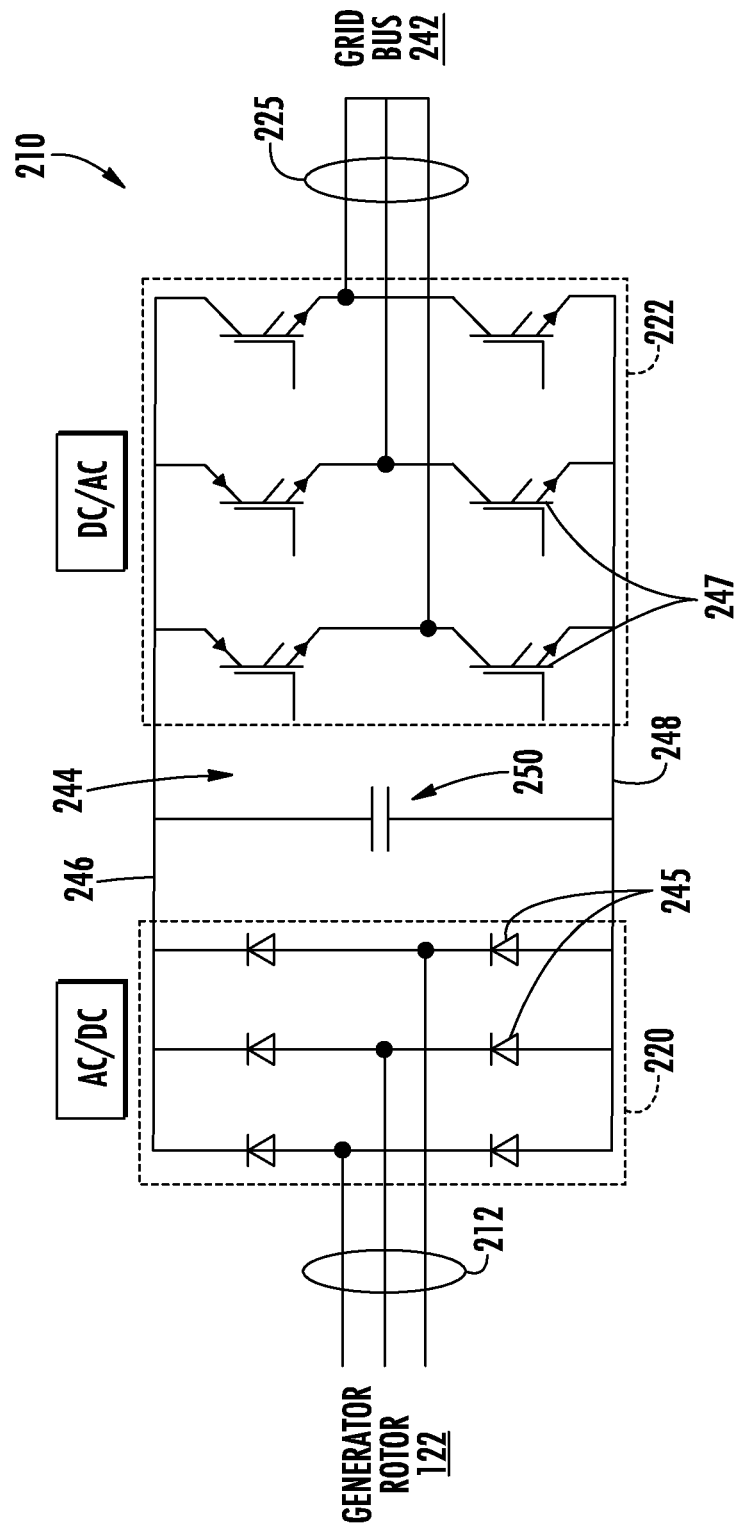
FIG. 4 illustrates a schematic diagram of one embodiment of a power converter of a wind turbine according to the present disclosure.

Referring particularly to FIGS. 2 and 4, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements 245 (e.g. diodes) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements 247 (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz).

It should be understood that the rotor-side power converter 220 and the line-side power converter 222 may have any configuration using any switching devices that facilitate operation of electrical power system 200 as described herein. For example, FIG. 4 illustrates a simplified schematic diagram of one embodiment of a variable frequency drive (VFD) that maintains a constant electrical frequency output on the grid side of the generator 118. As shown, the VFD configuration includes a six-switch voltage-sourced rectifier on the rotor side converter 220, the DC link capacitor 250 to minimize DC voltage variation, and a six-switch voltage-sourced inverter utilizing pulse width modulation on the grid side. More specifically, as shown, the rotor-side switching elements may be diodes 245 or silicon-controlled rectifiers (SCR), while the grid side-switching elements may be insulated gate bipolar transistors (IGBTs) 247. As such, the magnitude and electrical frequency of the current supplied to the generator rotor 122 through the VFD may be varied to account for changes in the rotor shaft speed and to maintain a constant output on the generator stator winding.

Further, the power conversion assembly 210 may be coupled in electronic data communication with the turbine controller 202 and/or a separate or integral converter controller 262 (FIG. 2) to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational parameters associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical power system 200 that facilitates operation of electrical power system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors 252, 254, 256, 258 may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art.

Thus, the converter controller 262 is also configured to receive one or more voltage and/or electric current feedback signals from the sensors 252, 254, 256, 258. More specifically, in certain embodiments, the current or voltage feedback signals may include at least one of line feedback signals, line-side converter feedback signals, rotor-side converter feedback signals, or stator feedback signals.

For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. As such, the converter controller 262 is configured to implement the various method steps as described herein and may be configured similar to the turbine controller 202.

Figure 5:
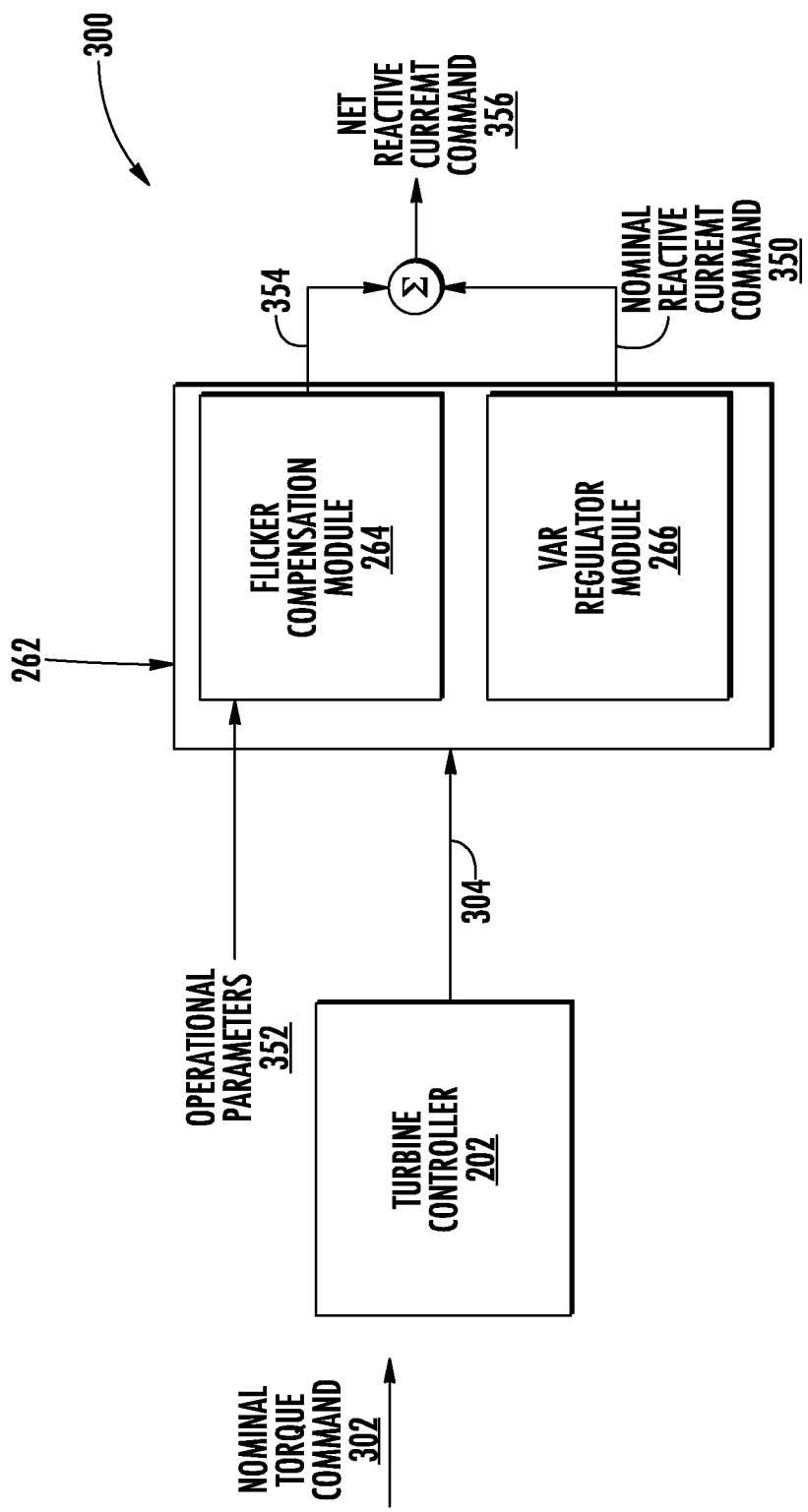
FIG. 5 illustrates a simplified, schematic diagram of one embodiment of a system for compensating for flicker induced by a wind turbine power system connected to a power grid according to the present disclosure.
Figure 6:
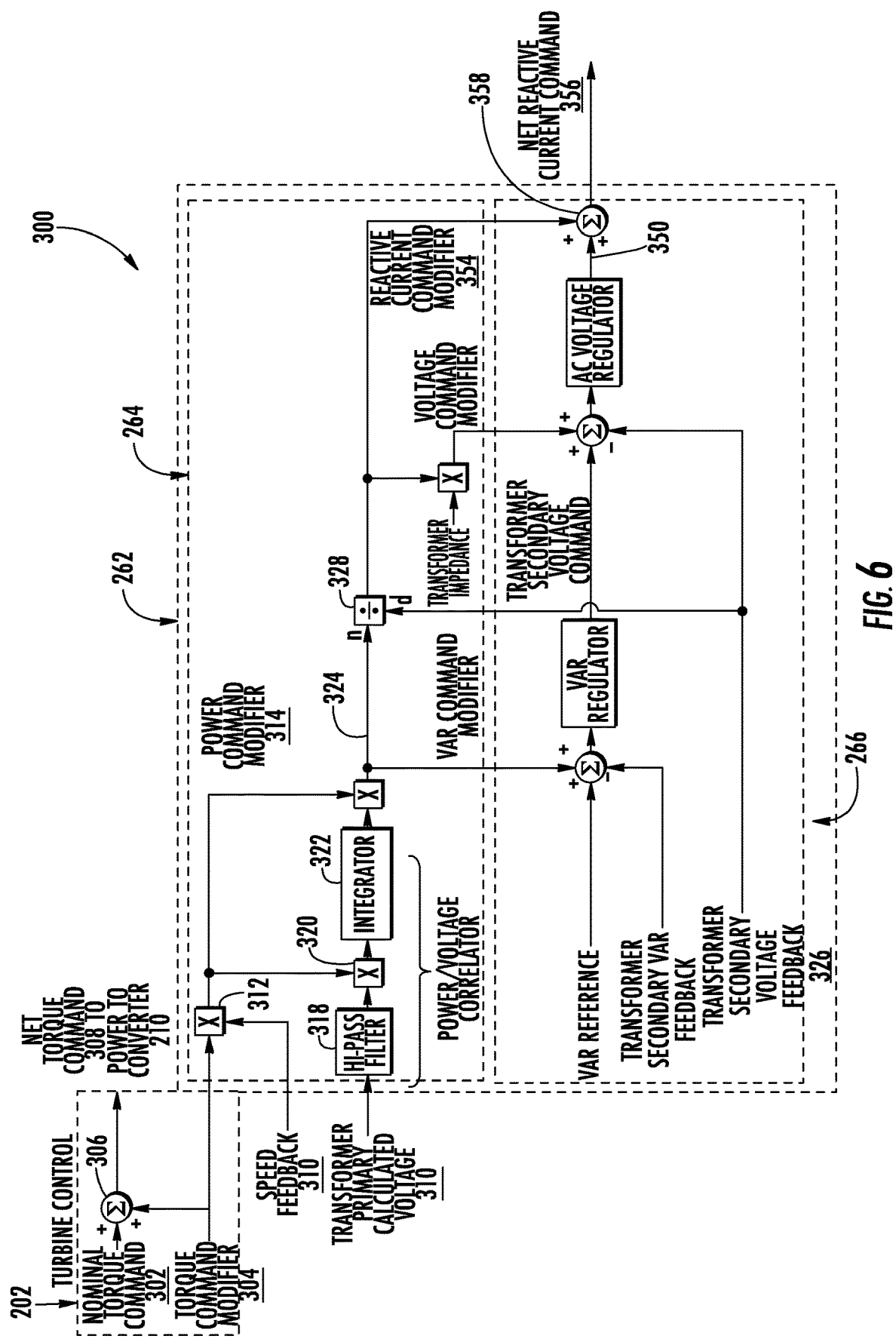
FIG. 6 illustrates a detailed, schematic diagram of one embodiment of a system for compensating for flicker induced by a wind turbine power system connected to a power grid according to the present disclosure.

Referring now to FIGS. 5 and 6, schematic diagrams of one embodiment of a system 300 for compensating for flicker induced by a wind turbine power system connected to a power grid, e.g. the wind turbine 100 of FIGS. 1 and 2, are illustrated. As shown, the system 300 may be implemented using the turbine controller 202 and/or the converter controller 262. More specifically, as shown, the converter controller 262 may include a flicker compensation module 264 and a reactive power (VAR) regulator module 266. Thus, during normal operation of the wind turbine 100, the turbine controller 202 operates the wind turbine 100 according to a nominal torque command 302. In addition, the VAR regulator module 266 may be configured to operate the power converter 210 of the wind turbine power system 100 based on a nominal reactive current command 350 (i.e. no flicker is present in the power grid). The VAR regulator module 266 may be configured according to any suitable configuration now known or later developed in the art.

In certain instances, however, it is desirable to modify the torque command 302 to the converter as each rotor blade 108 aligns with and passes the tower 104, e.g. via periodic torque command modifier 304. In particular embodiments, for example, the flicker compensation module 264 may be configured to correlate the periodic torque command modifier 304 with voltage variations (e.g. the output of 318) as one or more rotor blades 108 passes the tower 104. More specifically, as shown specifically in FIG. 6, the turbine controller 202 is configured to calculate the nominal torque command 302 and determine a net torque command 308 based on the nominal torque command 302 and the periodic torque command modifier 304 (e.g. by summing the nominal torque command 302 and the periodic torque command modifier 304 via summer 306). Modifying the torque command 302 in this manner and the resulting power variations, however, can cause undesirable low frequency voltage variations on the power grid (also referred to herein as flicker).

Thus, in such instances, the flicker compensation module 264 of the converter controller 262 may receive the periodic torque command modifier 304 from the turbine controller 202 as a separate signal. This separate signal will indicate to the flicker compensation module 264 that flicker is likely present in the power grid. As such, the flicker compensation module 264 may also receive one or more operational parameters 352 of the wind turbine power system 100 and/or the power grid. For example, in an embodiment, the operational parameter(s) 352 may include grid strength of the power grid, a grid voltage, a voltage signal from a primary winding of a main transformer of the wind turbine power system, a voltage signal from a secondary winding of the main transformer, a speed signal from a generator of the wind turbine power system, and/or an upstream impedance from the wind turbine power system 100.

Accordingly, the flicker compensation module 264 is configured to determine a reactive current command modifier 354 for the power converter 210 based on the one or more operational parameters 352 and the periodic torque command modifier 304. In such embodiments, the converter controller 262 can then simultaneously modify the nominal reactive current command 350 as a function of the reactive current command modifier 354 with the torque command 302, e.g. based on the correlation of the periodic torque command modifier 304 with the voltage variations as one or more rotor blades 108 passes the tower 104. Accordingly, simultaneously modifying the nominal reactive current command 350 and the torque command 302 attenuates the low-frequency voltage variations/flicker.

Referring specifically to FIG. 6, as shown, in one embodiment, the flicker compensation module 264 may receive the periodic torque command modifier 304 and determine a power command modifier 314 as a function of the periodic torque command modifier 304 and, e.g. the speed signal 310 from the generator 118. For example, as shown at 312, the periodic torque command modifier 304 may be multiplied by the speed signal 310 to obtain the power command modifier 314.

In addition, as shown in the illustrated embodiment, the flicker compensation module 264 may also receive the voltage signal 316 from a primary winding of the main transformer 234 and filter the voltage signal 316 via a filter 318 (e.g. a high-pass filter). The filtered voltage signal may then be multiplied by the power command modifier 314 as shown at 320. The multiplied signal may then be integrated via integrator 322 and multiplied by the power command modifier 314 to obtain a reactive power command modifier 324. As such, the multiplier 320 and he integrator 322 are configured to correlate the periodic torque command modifier 304 with the voltage variations as one or more rotor blades 108 passes the tower 104. As shown at 328, the reactive power command modifier 324 can then be divided by the voltage signal 326 from the secondary winding of the main transformer 234 to obtain the reactive current command modifier 354.

Accordingly, as shown in FIG. 6, in one embodiment, the system 300 can operate to simultaneously modify the nominal reactive current command 350 and the nominal torque command 302 by adding the nominal reactive current command 350 from VAR regulator 266 and the reactive current command modifier 354 from the flicker compensation module 264 as shown at 358 (e.g. to obtain the net reactive current command 356) and simultaneously adding the nominal torque command 302 and the torque command modifier 304 as shown at 306 (e.g. to obtain the net torque 308).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for compensating for flicker induced by a wind turbine power system connected to a power grid, the method comprising:
   operating, via a controller, a power converter of the wind turbine power system based on a nominal reactive current command and a nominal torque command;
   in response to receiving a periodic torque command modifier, determining, via the controller, a reactive current command modifier for the power converter based on one or more operational parameters of the wind turbine power system and/or the power grid and a nominal torque command modifier;
   simultaneously modifying, via the controller, the nominal reactive current command as a function of the reactive current command modifier and the nominal torque command as a function of the nominal torque command modifier,
   wherein modifying the nominal torque command causes low-frequency voltage variations in the power grid and simultaneously modifying the nominal reactive current command attenuates the low-frequency voltage variations,
   correlating, via the controller, the periodic torque command modifier with the one or more operational parameters as one or more rotor blades passes a tower of the wind turbine power system and simultaneously modifying the nominal reactive current command as a function of the reactive current command modifier based on the correlation.

2. The method of claim 1, wherein the one or more operational parameters comprises at least one of a grid strength of the power grid, a grid voltage, a voltage signal from a primary winding of a main transformer of the wind turbine power system, a voltage signal from a secondary winding of the main transformer, a speed signal from a generator of the wind turbine power system, or an upstream impedance from the wind turbine power system.

3. The method of claim 2, wherein the controller is a converter controller of the power converter.

4. The method of claim 1, further comprising determining the nominal reactive current command via a reactive power (VAR) regulator module in the converter controller.

5. The method of claim 4, wherein determining the reactive current command modifier for the power converter based on one or more operational parameters of the wind turbine power system and/or the power grid and the nominal torque command modifier further comprises:
   determining a power command modifier as a function of the periodic torque command modifier and the speed signal from the generator.

6. The method of claim 5, wherein determining the reactive current command modifier for the power converter based on one or more operational parameters of the wind turbine power system and/or the power grid and the nominal torque command modifier further comprises:
   receiving the voltage signal from a primary winding of the main transformer;
   filtering the voltage signal via a filter;
   multiplying the filtered voltage signal by the power command modifier to obtain a multiplied signal;
   integrating the multiplied signal to obtain an integrated signal;
   multiplying the integrated signal by the power command modifier to obtain a reactive power command modifier;
   dividing the reactive power command modifier by the voltage signal from the secondary winding of the main transformer to obtain the reactive current command modifier.

7. The method of claim 6, wherein the filter is a high-pass filter.

8. The method of claim 7, wherein simultaneously modifying the nominal reactive current command as a function of the reactive current command modifier and the nominal torque command as a function of the torque command modifier further comprises:
   adding the nominal reactive current command from the reactive power regulator and the reactive current command modifier; and
   adding the nominal torque command and the torque command modifier.

9. A wind turbine power system connected to a power grid, comprising:
   a power converter;
   at least one sensor for monitoring one or more operational parameters of at least one of the wind turbine power system or the power grid; and, a converter controller configured to control the power converter, the converter controller configured to perform a plurality of operations, the plurality of operations comprising:

operating the power converter based on a nominal reactive current command and a nominal torque command;

in response to receiving a periodic torque command modifier, determining a reactive current command modifier for the power converter based on the one or more operational parameters and/or the power grid and a torque command modifier; and, simultaneously modifying the nominal reactive current command as a function of the reactive current command modifier and the nominal torque command as a function of the torque command modifier, wherein modifying the nominal torque command causes low-frequency voltage variations in the power grid and simultaneously modifying the nominal reactive current command attenuates the low-frequency voltage variations, correlating the periodic torque command modifier with the one or more operational parameters as one or more rotor blades passes a tower of the wind turbine power system and simultaneously modifying the nominal reactive current command as a function of the reactive current command modifier based on the correlation.

10. The wind turbine power system of claim 9, wherein the one or more operational parameters comprises at least one of a grid strength of the power grid, a grid voltage, a voltage signal from a primary winding of a main transformer of the wind turbine power system, a voltage signal from a secondary winding of the main transformer, a speed signal from a generator of the wind turbine power system, or an upstream impedance from the wind turbine power system.

11. The wind turbine power system of claim 10, wherein the generator comprises a doubly-fed induction generator (DFIG).

12. The wind turbine power system of claim 10, further comprising a turbine controller communicatively coupled to the converter controller, the turbine controller configured to perform a plurality of operations, comprising:

determining a power command modifier as a function of the periodic torque command modifier and the speed signal from the generator.

13. The wind turbine power system of claim 12, wherein determining the reactive current command modifier for the power converter based on the one or more operational parameters and/or the power grid and the torque command modifier further comprises:

receiving the voltage signal from a primary winding of the main transformer;

filtering the voltage signal via a filter;

multiplying the filtered voltage signal by the power command modifier to obtain a multiplied signal;

integrating the multiplied signal to obtain an integrated signal;

multiplying the integrated signal by the power command modifier to obtain a reactive power command modifier;

dividing the reactive power command modifier by the voltage signal from the secondary winding of the main transformer to obtain the reactive current command modifier.

14. The wind turbine power system of claim 13, wherein the filter is a high-pass filter.

15. The wind turbine power system of claim 13, further comprising determining the nominal reactive current command via a reactive power (VAR) regulator module.

16. The wind turbine power system of claim 15, wherein simultaneously modifying the nominal reactive current command as a function of the reactive current command modifier and the nominal torque command as a function of the torque command modifier further comprises:

adding the nominal reactive current command from the reactive power regulator and the reactive current command modifier; and adding the nominal torque command and the torque command modifier.

17. A method for mitigating low-frequency voltage variations in a power grid caused by a wind turbine power system connected thereto, the method comprising:

receiving, via a controller, one or more operational parameters of at least one of the wind turbine power system or the power grid and a nominal torque command modifier; and, modifying, via the controller, a reactive current command of the wind turbine power system as a function of the one or more operational parameters and the nominal torque command modifier while simultaneously modifying a torque command of the power converter based on the nominal torque command modifier, correlating, via the controller, the periodic torque command modifier with the one or more operational parameters as one or more rotor blades passes a tower of the wind turbine power system and simultaneously modifying the nominal reactive current command as a function of the reactive current command modifier based on the correlation.

18. The method of claim 17, wherein the one or more operational parameters comprises at least one of a grid strength of the power grid, a grid voltage, a voltage signal from a primary winding of a main transformer of the wind turbine power system, a voltage signal from a secondary winding of the main transformer, a speed signal from a generator of the wind turbine power system, or an upstream impedance from the wind turbine power system.

* * * * *